US011099333B2

(12) United States Patent
Shang

(10) Patent No.: US 11,099,333 B2
(45) Date of Patent: Aug. 24, 2021

(54) OPTICAL FIBER GUIDEWIRE, ARRAY MAGNETIC OPTICAL FIBER CONNECTOR AND METHOD FOR USING THE SAME

(71) Applicant: Hua Shang, Nanjing (CN)

(72) Inventor: Hua Shang, Nanjing (CN)

(73) Assignee: Hua Shang, Nanjing (CN)

( * ) Notice: Subject to any disclaimer, the term of this patent is extended or adjusted under 35 U.S.C. 154(b) by 0 days.

(21) Appl. No.: 16/849,567

(22) Filed: Apr. 15, 2020

(65) Prior Publication Data

US 2021/0033803 A1 Feb. 4, 2021

Related U.S. Application Data

(63) Continuation of application No. PCT/CN2019/105083, filed on Sep. 10, 2019.

(30) Foreign Application Priority Data

Jul. 31, 2019 (CN) .......................... 201910700942.3

(51) Int. Cl.
*G02B 6/38* (2006.01)
*G02B 6/44* (2006.01)

(52) U.S. Cl.
CPC ......... *G02B 6/3886* (2013.01); *G02B 6/3882* (2013.01); *G02B 6/443* (2013.01)

(58) Field of Classification Search
CPC .. G02B 6/3886; G02B 6/3825; G02B 6/3882; G02B 6/443; G02B 6/405; G02B 6/3887; G02B 6/3807; G02B 6/381
See application file for complete search history.

(56) References Cited

U.S. PATENT DOCUMENTS

| 4,844,582 | A  | * | 7/1989 | Giannini | G02B 6/3817 |
|||||||385/57|
| 7,331,793 | B2 | * | 2/2008 | Hernandez | H01F 38/14 |
|||||||439/38|
| 9,869,826 | B1 | * | 1/2018 | Shang | G02B 6/3873 |
| 10,082,631 | B2 | * | 9/2018 | Lee | G02B 6/3886 |

(Continued)

FOREIGN PATENT DOCUMENTS

| CN | 106512232 | 3/2017 |
| CN | 207614188 | 7/2018 |

(Continued)

*Primary Examiner* — Ryan A Lepisto
*Assistant Examiner* — Erin D Chiem
(74) *Attorney, Agent, or Firm* — Andrus Intellectual Property Law, LLP

(57) ABSTRACT

This disclosure relates to an optical fiber guidewire, an array magnetic optical fiber connector and a method for using the same. The optical fiber guidewire includes an optical fiber and an array magnetic optical fiber connector. The connector includes optical fiber magnetic joints disposed on the optical fibers and further includes an array magnetic connector mated with the optical fiber magnetic joints. The array magnetic connector is provided with a plurality of holes. The optical fiber magnetic joint includes optical fiber pins that can be sleeved around a periphery of the optical fiber. When the optical fiber pins are inserted into the holes, the optical fiber pins on both sides of the holes are paired to connect two optical fibers wrapped in the optical fiber pins, so as to realize a light transmission.

5 Claims, 4 Drawing Sheets

(56) References Cited

U.S. PATENT DOCUMENTS

| | | | | |
|---|---|---|---|---|
| 2009/0028495 A1* | 1/2009 | Anrig | ................ | G02B 6/3817 |
| | | | | 385/14 |
| 2009/0257722 A1* | 10/2009 | Fisher | ................ | G02B 6/3878 |
| | | | | 385/115 |
| 2011/0171837 A1* | 7/2011 | Hardisty | ............ | H01R 13/6205 |
| | | | | 439/39 |
| 2014/0120746 A1* | 5/2014 | Persion | ................ | H01R 11/30 |
| | | | | 439/39 |
| 2017/0093104 A1* | 3/2017 | Powers | ................ | H01R 31/06 |

FOREIGN PATENT DOCUMENTS

| | | | | |
|---|---|---|---|---|
| CN | 207679870 | | 8/2018 | |
| CN | 106955423 | | 2/2020 | |
| JP | 2001215362 A | * | 8/2001 | ............ G02B 6/3886 |

* cited by examiner

OPTICAL FIBER GUIDEWIRE, ARRAY MAGNETIC OPTICAL FIBER CONNECTOR AND METHOD FOR USING THE SAME

CROSS REFERENCE TO RELATED APPLICATIONS

This application is a bypass continuation application of International Patent Application No. PCT/CN2019/105083 filed on Sep. 10, 2019, which claims priority to Chinese patent application No. CN201910700942.3, filed on Jul. 31, 2019, contents of both of which are incorporated herein by reference in their entireties.

TECHNICAL FIELD

The disclosure relates to the technical field of medical instruments, specifically to an optical fiber guidewire, an array magnetic optical fiber connector and a method for using the same.

BACKGROUND

Optical fiber is short for an optical waveguide fiber, and is a light transmission tool adopting the principle of total reflection of light in fibers made of glass or plastic. A micro optical fiber is encapsulated in a plastic sheath, enabling it to bend without breaking. Usually, a transmitting device at one end of the optical fiber transmits a light pulse to the optical fiber through a light emitting diode (LED) or a laser beam, and a receiving device at the other end of the optical fiber detects the pulse through a photosensitive element.

An optical fiber connector (also known as an optical fiber adapter or flange) is an element that is detachable (active) connected between optical fibers. It precisely mates two end surfaces of two optical fibers, so that the optical energy output from the transmitting optical fiber can be maximally coupled to the optical receiving fiber and the impact on the system due to its involvement in the optical link can be minimized. The optical fiber connector also affects the reliability and performance of optical transmission system to some extent.

In the actual application, the optical fiber connector can be classified based on the structure. Here are some of common optical fiber interfaces and optical fiber connectors.

i. FC type Connector: the FC (the abbreviation of Ferrule Connector) type connector is a round metal joint with threads, and fastened by a turnbuckle. Generally, the FC type connector is used on the ODF (common in patch panel), and a nut thereof is screwed onto the adapter. This type of connector has advantages including firm, dustproof, and disadvantages including long installation time.

ii. SC type Connector: the SC type connector is a snap-in plastic square connector. The structures and sizes of a pin and a coupling sleeve are the same as those of the FC type connector. An end surface of the pin is mostly polished by means of PC or APC. This type of connector uses plug-pull way for fastening without rotating. The SC type connector can be directly plugged and unplugged, and thus is convenient in use. However, the SC type connector has the disadvantage of being easy to fall out. Generally, it is used at the optical interface of the transmitting device. 1×9 optical module and GBIC optical module all use the SC type connector.

iii. ST type Connector: the ST type connector is a snap-in metal joint with round housing and uses a turnbuckle for fastening. The ST type connector is commonly used in optical fiber patch panel. It can be fixed by rotating the ST head for half a rotation into a bayonet after inserting. However, the ST type connector has the disadvantage of being easily broken.

iv. LC type Connector: the LC type connector is a small square plastic connector that is similar as the SC type connector in shape, but smaller. It is made with a convenient modular jack (RJ) latch mechanism. The LC type connector is used in the SFP module. At present, in terms of the single mode SFF, LC type connector has occupied a dominant position, and also is used widely in the application of multimode.

v. MT-RJ type Connector: the MT-RJ type connector is a square precision plastic rubber connector. It starts in the MT connector developed in NTT, and is made with the same type of latch mechanism as RJ-45 LAN electrical connector. Guide pins are installed on both sides of the small casing for the alignment of optical fiber. The MT-RJ interface has the size which is the same as that of a standard phone, and can be installed in the RJ-45 panel and patch panel module. In order to facilitate connection with the optical transceiver, the connector end surface fiber is a two-core (interval of 0.75 mm) arrangement design, and is the next generation high-density fiber optic connector mainly used for data transmission.

vi. Biconic Connector: the most representative product of this type connector is developed by Bell Laboratory of the United States. This product consists of two plugs with precision-molded ends of frusto-conical cylindrical shape and a coupling assembly with a double-tapered plastic sleeve inside.

The optical fiber connectors mentioned above achieve a mechanical connection of optical fibers by a thread or snap joint. However, such connection has disadvantages including: i) it is required to rotate the optical fibers during the connection, resulting in a long connection operation and cumbersome steps; ii) an insertion loss in optical fibers after connection is greatly affected by the rotation force when connecting, resulting in a large difference in insertion loss among different connections; iii) once the connection is completed, the optical fibers cannot be rotated during use; iv) when the multi-optical fibers arranged as an array are connected, a single unit occupies a large space due to the need for a rotation operation for disassembly, and thus cannot be closely arranged.

SUMMARY

In view of the above, an object of the disclosure is to provide an optical fiber guidewire, an array magnetic optical fiber connector and a method for using the same, so as to solve deficiencies in the prior art.

The object of the disclosure is achieved by the following technical solutions.

An object of the disclosure is to provide an optical fiber guidewire, which includes an optical fibers and an array magnetic optical fiber connector detachably connected to the optical fibers. The array magnetic optical fiber connector includes optical fiber magnetic joints disposed on the optical fibers, and array magnetic connectors for docking with the optical fiber magnetic joints. The array magnetic connectors are penetrated by a plurality of holes. The optical fiber magnetic joints include optical fiber pins capable of being sleeved around a periphery of the optical fibers. When the optical fiber pins are inserted into the holes, the optical fiber pins on both sides of the hole are paired to connect two optical fibers wrapped in the optical fiber pins, so as to realize a light transmission. The optical fiber magnetic joint is connected with the array magnetic connector through a magnetic attraction between each other.

Further, the optical fiber magnetic joint further includes an annular ring and an annular ring holder for holding the annular ring. The annular ring is disposed at a rear end of the optical fiber pin. The annular ring holder is disposed at a rear end of the annular ring and fixes the annular ring on the optical fiber. The optical fiber pins protrude into the holes to pair the optical fiber wrapped in the optical fiber pins with the optical fiber that protrudes from the other side of the holes.

Further, an outer thread is provided on a main body and an inner thread that matches with the outer thread is provided on an inner wall of the annular ring holder to tightly fix the annular ring holder and the main body, realizing the fixation of the annular ring.

Preferably, the annular ring is a magnetic annular ring that can be magnetically connected to the array magnetic connector.

Further, the array magnetic connector includes a main body portion and two cover plates respectively disposed on opposite sides of the main body portion.

The holes penetrate through the main body portion and the two cover plates.

Further, the cover plates are magnetic cover plates, and when the optical fiber magnetic joints are inserted into the holes, the two cover plates are respectively magnetically attracted to two magnetic annular rings on both sides.

Another object of the disclosure is to provide an optical fiber array magnetic connector, which includes the optical fiber magnetic joints and the array magnetic connectors as mentioned above.

A final object of the disclosure is to provide a method for using an optical fiber array magnetic connector. The method includes the following operations.

Step 1: optical fibers are prepared, and a main body and optical fiber pins are sleeved over an end of the optical fibers to be paired; then, an annular ring is sleeved on an end of the main body near the optical fiber pins and abuts a rear end of a protruding portion; an annular ring holder is sleeved on the main body by a means of thread connection and tightly presses the annular ring against the rear end of the protruding portion, so that the annular ring cannot be moved backward.

Step 2: the optical fiber pin wrapped with the optical fibers of Step 1 is inserted into a hole of the array magnetic connector from one side of the hole, so that the optical fiber magnetic joint and the array magnetic connector are magnetically connected; then another optical fiber pin wrapped with the optical fiber is inserted into the hole from other side of the hole, and thus the optical fiber pins on both sides of the hole are close to or in contact with each other at a center of the hole, so that ends of the two optical fibers wrapped in two optical fiber pins are close to or in contact with each other, achieving a light transmission.

The disclosure provides an array magnetic optical fiber connector and a method for using the same, and the embodiments of the disclosure mainly have the following beneficial effects.

The connectors are arrayed and thus can be used for connecting multiple pairs of optical fibers. In the present disclosure, the optical fiber magnetic connector is used. The connector and the joint have opposite magnetism and are arranged in an array. Therefore, when connecting, it is just required to gently insert the optical fiber joint, and the optical fiber will be automatically attracted to the connector after insertion. When disconnecting, it is just required to pull out the joint with certain of forces. It is easy to operate and short in time, which reduces the operation time of the optical fiber connection. Meanwhile, the coupling strength of the connection is ensured by the magnetic strength of the attraction. The magnetic attraction or insertion loss has highly consistency, and the connection of multiple pairs of fiber and multiple connections of optical fibers both have good consistency. Moreover, after inserting, the optical fiber can also be rotated without affecting the coupling efficiency, and the plugging operation can be conveniently and quickly performed even when optical fiber plugs are densely arranged.

Figure 1:
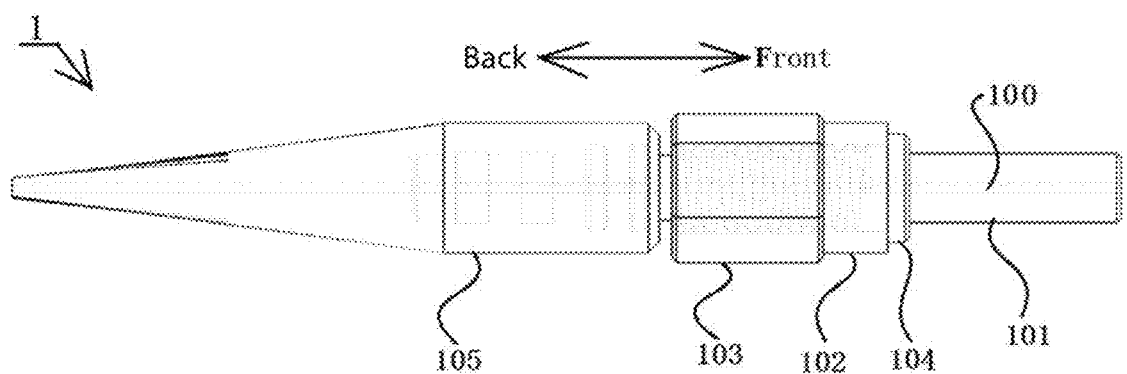
FIG. 1 is a schematic diagram illustrating the structure of an optical fiber magnetic joint.
Figure 2:
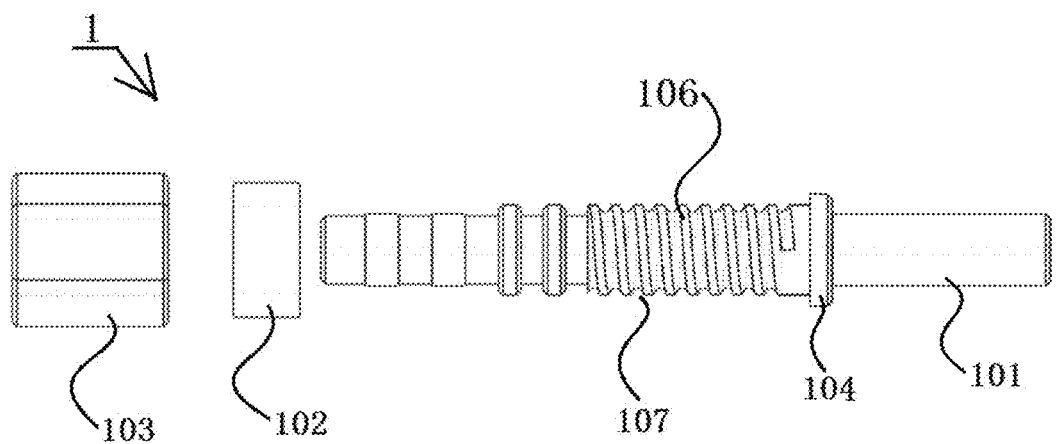
FIG. 2 is a schematic exploded view illustrating the structure of the optical fiber magnetic joint.
Figure 3:
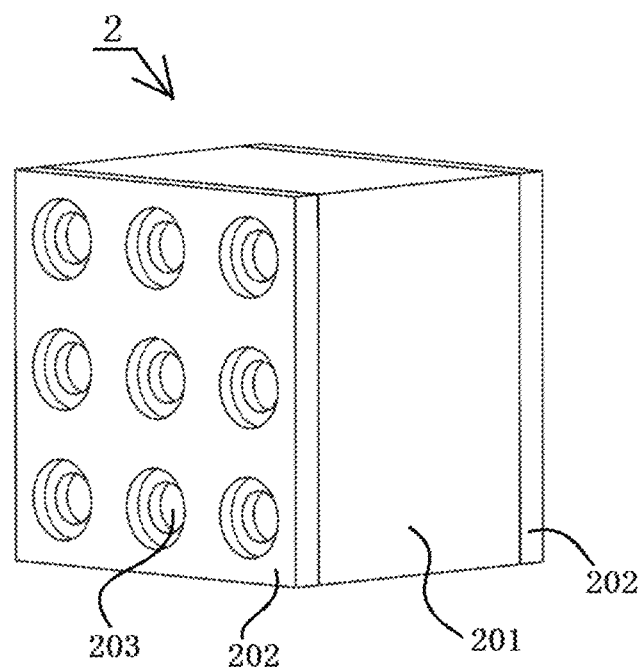
FIG. 3 is a schematic diagram illustrating the structure of an array magnetic connector.

LIST OF REFERENCE SYMBOLS 1, optical fiber magnetic joint; 2, array magnetic connector; 100, optical fiber; 101, optical fiber pin; 102, annular ring; 103, annular ring holder; 104, protruding portion; 105, tail protecting jacket; 106, outer thread; 107, main body; 108, fiber protecting nozzle; 201, main body portion, 202, cover plate; 203, holes; 204, flared hole; 205, first hole; 206, second hole; 207, first elastic pad; 208, second elastic pad; 209, hole cavity.

DETAILED DESCRIPTION

Technical solutions in embodiments of the disclosure will be described clearly and completely below. It is apparent that the embodiments in the following description are only some illustrative embodiments, not all embodiments of the disclosure. The protection scope of the disclosure is not intended to be limited by embodiments of the disclosure provided below, but just represent selected embodiments of the disclosure. Based on embodiments of the disclosure, other embodiments that can be obtained by those skilled in the art without paying any creative work belong to the protection scope of the disclosure.

Embodiment 1

As shown in FIGS. 1-5 and 8, an array magnetic optical fiber connector is provided. The array magnetic optical fiber connector includes optical fiber magnetic joints 1 disposed on two optical fibers 100 to be paired together. One optical fiber magnetic joint 1 is disposed on one optical fiber. The array magnetic optical fiber connector also includes array magnetic connectors 2 mated with the optical fiber magnetic joints 1.

The array magnetic connector 2 may be of a cuboid (including a cube), has a plurality of holes 203 which penetrate through wall of the array magnetic connector on opposite sides and are used for receiving the ends of the optical fibers 100 to be paired.

The optical fiber magnetic joint 1 includes optical fiber pins 101 that can be fitted around the periphery of the optical fibers 100. That is, the optical fiber pins 101 are wrapped around ends of the optical fiber 100 to be paired. The optical fiber pins 101 insert into the holes 203, so as to achieve the pairing of end surfaces of two optical fibers 100.

In use, two optical fiber pins 101 of two optical fiber magnetic joints 1 are respectively inserted into a hole 203 from both sides of the hole 203, and then the two optical fiber pins 101 are combined in the hole 203 to connect two optical fibers wrapped in the optical fiber pins 101, so as to realize light transmission. That is, light is transmitted from one optical fiber to the other optical fiber. The two optical fibers may be completely combined together, or there can be a gap between them.

As a further preferred embodiment, the optical fiber magnetic joint 1 further includes an annular ring 102 and an annular ring holder 103 for fixing the annular ring 102. The annular ring 102 is disposed at a rear end of the optical fiber pin 101. The annular ring holder 103 is disposed at a rear end of the annular ring 102 and fixes the annular ring 102 on the optical fiber 100. The optical fiber pin 101 protrudes into the holes 203 to pair the optical fiber wrapped in the optical fiber pins with the optical fiber that protrudes from other side of the holes 203.

The array magnetic connector 2 includes a main body portion 201 and two cover plates 202 respectively disposed on opposite sides of the main body portion 201.

The holes 203 penetrate through the main body portion 201 and the two cover plates 202.

As a further preferred embodiment, the optical fiber magnetic joint 1 further includes a tubular main body 107 that can be exactly sleeved over the optical fiber. One end of the main body 107 (i.e., the front end of the main body 107) is connected to the optical fiber pin 101. The other end of the main body 107 (i.e., the rear end of the main body 107) can be connected to a tail protecting jacket 105 that can be sleeved over the optical fiber.

The annular ring 102 and the annular ring holder 103 are both disposed outside the main body 107. Preferably, an outer thread 106 is provided on the main body 107, and an inner thread that matches the outer thread 106 is provided on an inner wall of the annular ring holder 103 to tightly fix the annular ring holder 103 and the body 107, realizing the fixation of the annular ring.

A protruding portion 104 having a diameter larger than that of the body 107 is disposed on the body 107 near the optical fiber pin 101. The annular ring abuts against the protruding portion 104 to prevent sliding out from one end of the optical fiber pin 101. The outer thread 106 is disposed at a rear end of the protruding portion 104. The inner diameter of the hole 203 is not larger than the outer diameter of the protruding portion 104, so that the protruding portion 104 and the rear portion of the protruding portion 104 cannot enter the hole 203.

As a further preferred embodiment, the tail protecting jacket 105 is a tapered jacket, and an outer diameter of the tapered jacket is sequentially increased from the free end to the end connected to the body 107. The diameter is gradually reduced from the front end to the rear end, and the diameter is close to the diameter of the optical fiber at the terminal end. Therefore, this structure has a better protection effect on the optical fiber. A length of the tail protecting jacket may be determined according to actual practices, for example, 20 mm to 100 mm. Of course, it may be outside the range as long as it does not affect its normal use.

In specific use, the optical fiber magnetic joint 1 and the array magnetic connector 2 are connected each other by a magnetic attraction. Any part of the optical fiber magnetic joint and the array magnetic connector at the connection portion can be used as the magnetically attracted portion. For example, if the cover plate 202 and the annular ring 102 are magnetic and the polarities or magnetic properties are opposite therein, the cover plate 202 can be attracted to the annular ring 102.

Embodiment 2

On the basis of Embodiment 1, the annular ring 102 is an annular ring having magnetism, and can be connected to the array magnetic connector 2 by magnetic bonding.

The cover plate 202 may be a magnetic cover plate. When the optical fiber magnetic joint 1 is inserted into the hole 203, the two magnetic cover plates are respectively magnetically attracted to the two magnetic annular rings on both sides.

Figure 4:
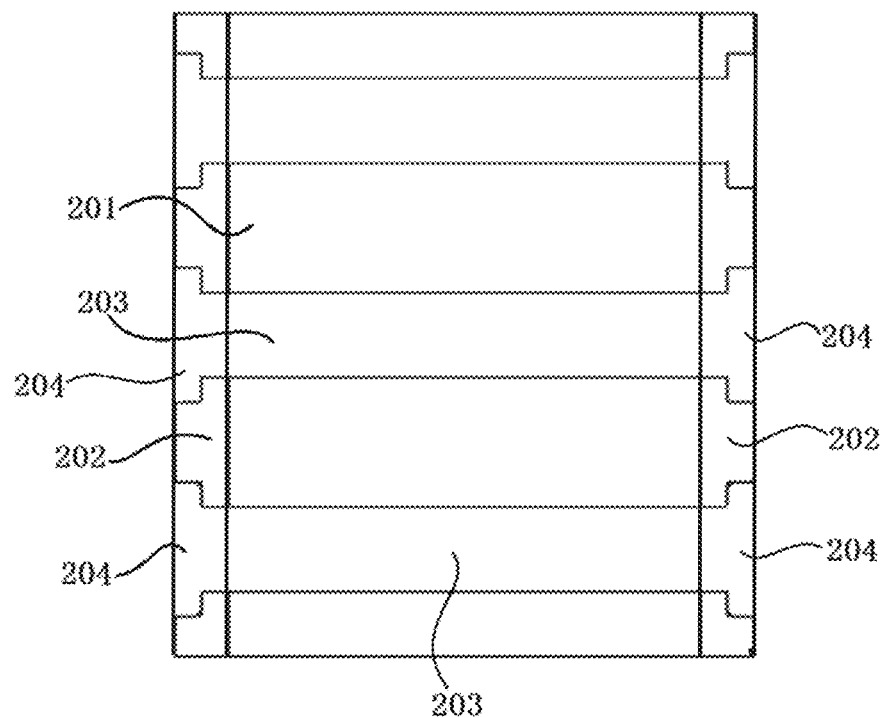
FIG. 4 is a schematic cross-sectional diagram illustrating the array magnetic connector.
Figure 5:
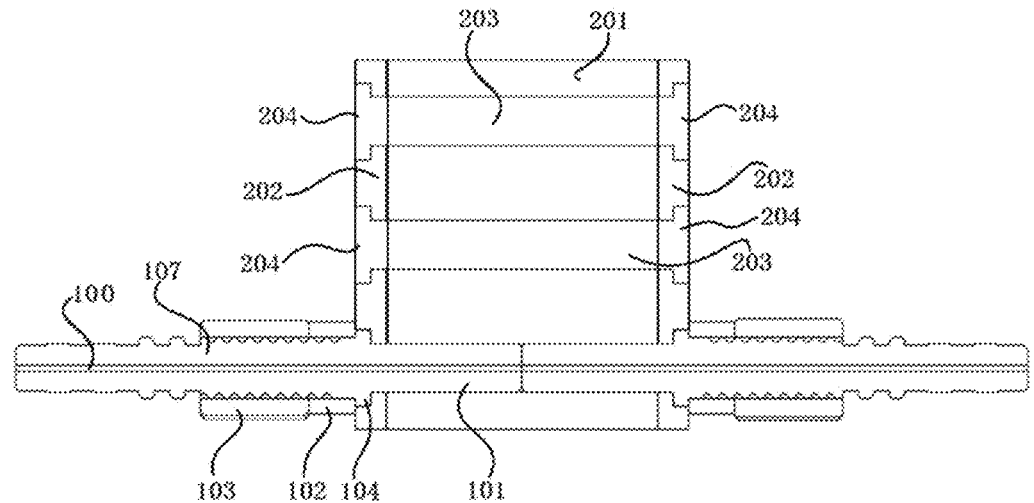
FIG. 5 is a schematic cross-sectional diagram illustrating the connection of the optical fiber magnetic joint and the array magnetic connector.

An outer surface of the cover plate 202 is provided with a flared hole 204 corresponding to each hole 203. The flared hole 204 communicates and is concentric with the hole 203. An inner diameter of the flared hole 204 is not less than the outer diameter of the protruding portion 104 of the optical fiber magnetic joint 1, as shown in FIGS. 4-5, so that the protruding portion 104 is exactly located in the flared hole 204 when the optical fiber magnetic joint 1 is connected to the array magnetic connector 2, then the side of the cover plate 202 near the annular ring 102 is in contact with the annular ring 102 and the cover plate 202 is magnetically connected to the annular ring 102.

Embodiment 3

Figure 6:
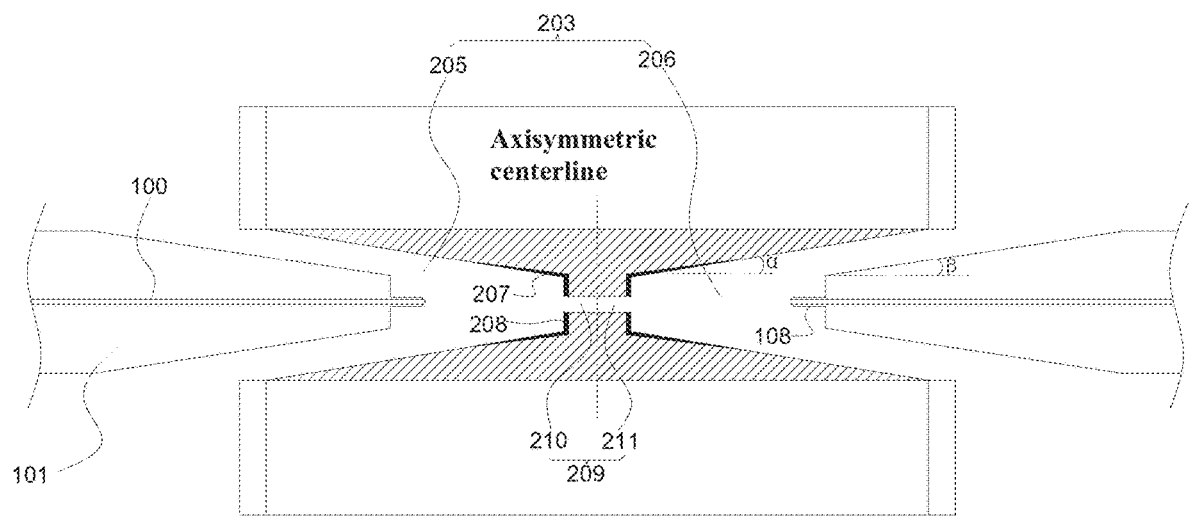
FIG. 6 is a schematic diagram illustrating a matching relationship between holes and optical fiber pins according to Embodiment 3.
Figure 7:
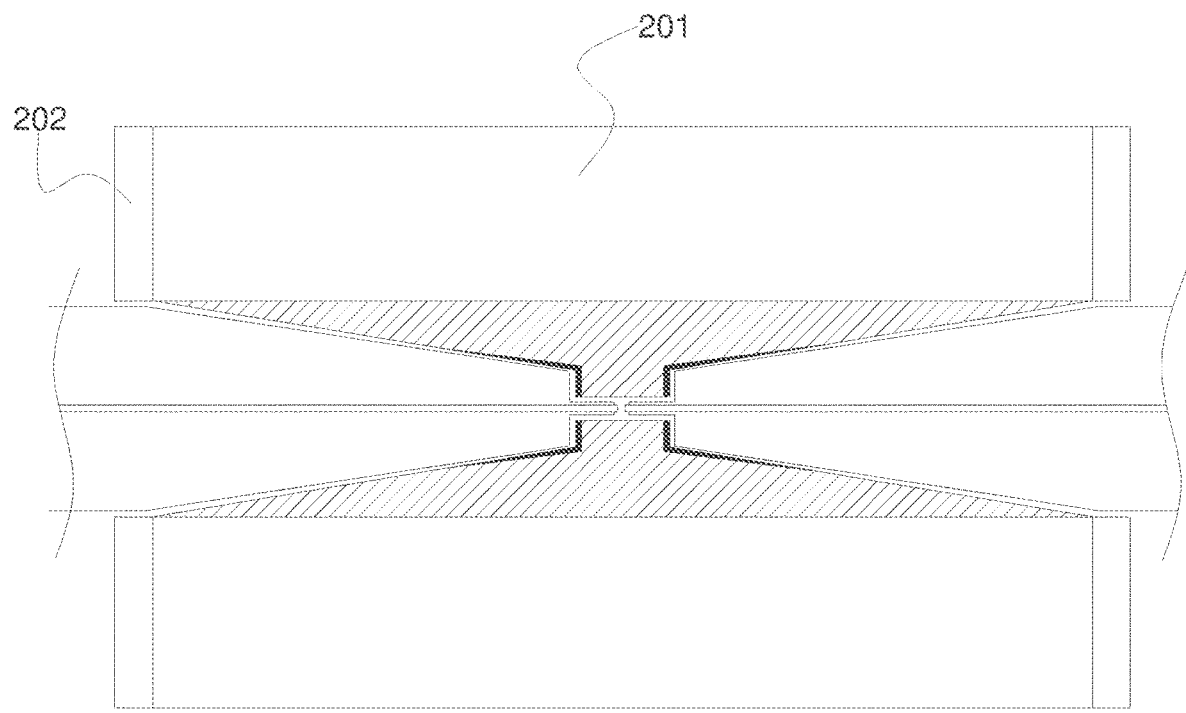
FIG. 7 is a schematic structural diagram illustrating the optical fiber pins being inserted into holes according to Embodiment 3.
Figure 8:
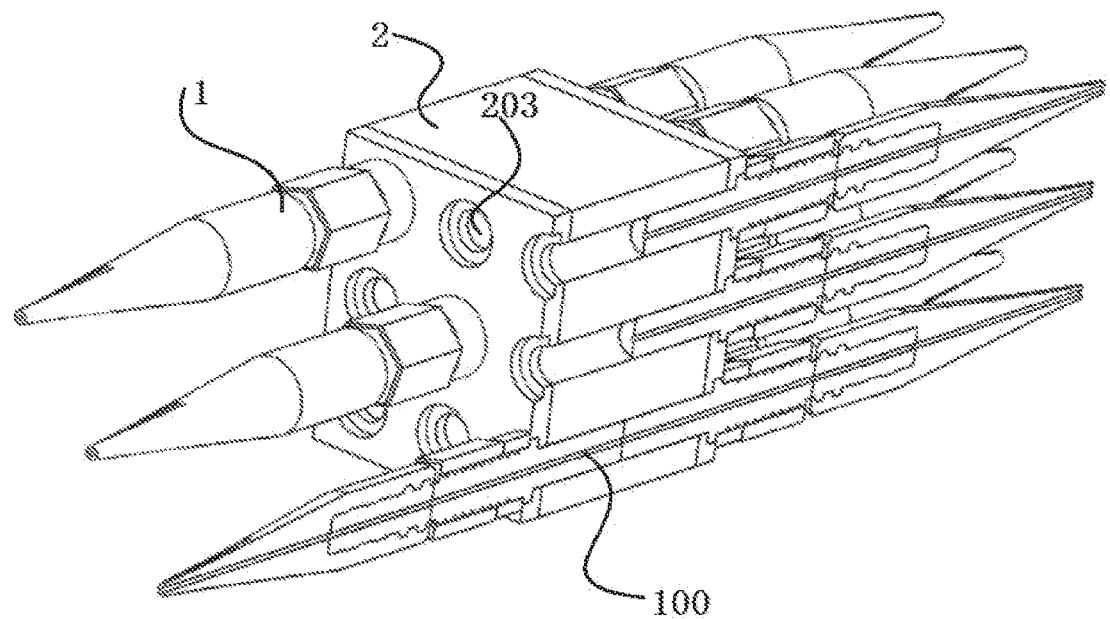
FIG. 8 is a schematic structural diagram illustrating the optical fiber magnetic joint being connected with the array magnetic connector.

On the basis of Embodiment 1 or 2, as shown in FIGS. 6-7, the hole 203 is composed of a first hole 205 and a second hole 206 which are identical in size and shape and are symmetric. The first hole 205 and the second hole 206 are axisymmetric with each other by a centerline. The first hole 205 and/or the second hole 206 have a diameter that is gradually reduced from outside to inside and are in shape of a cone or truncated cone. The diameter of the first hole 205 and/or the second hole 206 at where the smallest diameter is, i.e., at the most intermediate portion, in other word, at where the first hole 205 and the second hole 206 are connected or are in communication (i.e., hole cavity 209), is not less than the diameter of the optical fiber wrapped in the optical fiber pin 101, so that the optical fibers on both sides of the hole 203 are paired and are close to each other at the center of the hole 203, achieving the light transmission.

The optical fiber pin 101 has a diameter that is gradually reduced from the rear end ((i.e., the end connected to the annular ring 102) to the front end (i.e., the free end) and is in a shape of cone, so as to be exactly received in the first aperture 205 and/or the second aperture 206.

The first hole 205 and/or the second hole 206 have an magnetic inner wall. And, the smaller the diameter is, the stronger the magnetic property is. Alternatively, only the end that has smaller diameter and near to the center of the hole possesses the magnetic property. The uneven distribution of magnetic property facilitates to attract the optical fiber pin 102 into the hole 203 by magnetic attraction, and facilitates the pairing of the two optical fiber pins 101, i.e., the contact or proximity of the two optical fibers wrapped in the optical fiber pin 101.

The optical fiber pin 101 has an outer wall that can be magnetically attracted to the inner wall of the first hole 205 and/or the second hole 206, so that the optical fiber pin 101 and the hole 203 are magnetically attracted. Similarly, the smaller the outer diameter of the optical fiber pin 101 is, the stronger the magnetic property is. In this way, when connection is performed, the optical fiber pin 101 is inserted into the innermost side of the hole. That is, the optical fiber pin 101 can be brought into the innermost side without manual processing, and thus this configuration has a function for limiting the position, so that the optical fiber magnetic joints 1 on both sides of the hole achieve a better pairing effect of optical fiber, ensuring more efficient light transmission.

As a further preferred embodiment, the optical fiber pin 101 has a truncated cone structure. An optical fiber protecting nozzle 108 is provided at the center of the end surface of the free end and extends outward along the axis of the optical fiber or the optical fiber pin 101. The optical fiber protecting nozzle 108 is wrapped around the periphery of the optical fiber. That is, the optical fiber extends from the free end of the protecting nozzle or is flush with the end surface of the optical fiber protecting nozzle 108. According to actual needs, the fiber protection nozzle 108 may be omitted, and the optical fiber to be paired is disposed to extend out of the optical fiber pin, such as extending out 0.1-0.5 cm, etc., depending on the actual practices.

As a further preferred embodiment, the first hole 205 and/or the second hole 206 have a truncated cone structure capable of cooperating with the optical fiber pin 101. The first hole 205 and the second hole 206 is respectively provided a first hole cavity 210 and second hole cavity 211 capable of accommodating the fiber protecting nozzle 108 at the innermost center (i.e., the middle portion of the hole). If the fiber protecting nozzle 108 is omitted, the first hole cavity 210 and second hole cavity 211 is capable of accommodating the optical fiber. The first hole cavity 210 and second hole cavity 211 are in communication to realize the pairing of two optical fibers.

More preferably, in the first hole 205 and/or the second hole 206, the sidewall(s) has a slope not less than the slope of the outer wall of the optical fiber pin 101. As shown in FIG. 6, the angle $\alpha$ is not less than the angle $\beta$. If the angle $\alpha$ is greater than the angle $\beta$, the angle $\alpha$ is not more than 5 degrees larger than the angle $\beta$. In this way, the connection between the hole and the optical fiber pin 101 is tighter, and the stability of the optical fiber pairing is stronger.

The inner side surface near the center of the first hole 205 and the second hole 206 are respectively provided with a first elastic pads 207. When the optical fiber pin 101 inserts the first hole 205 or the second hole 206, if the slopes of the optical fiber pin and the hole are different, the side surface near the free end of the optical fiber pin 101 will be in contact with the inner wall of the hole. As the magnetic property increases toward the inside, and thus the magnetic force increases toward the inside, the optical fiber pin 101 forces the first elastic pad 207 to continue moving inwardly. During the inward movement, as the frictional force increases, the relative position of the optical fiber pin 101 and the hole is more stable.

Specifically, the thickness of the elastic pad and the angle at which $\alpha$ is larger than $\beta$ may be determined according to actual practices, as long as the optical fiber inserted from the first hole 205 and the optical fiber inserted from the second hole 206 can be well paired or can be close each other, so as to achieve an efficient light transmission.

The innermost side of the first hole 205 and the second hole 206 are respectively provided with a second elastic pad 208. A through hole is provided at the center of the second elastic pad 208 and can pass through the optical fiber protecting nozzle 108. If the fiber protecting nozzle 108 is omitted, the through hole can pass through the optical fiber. The through hole is in communication with the hole cavity 209 in the center of the hole, see FIGS. 6-7.

The optical fiber, the optical fiber magnetic joint 1 and the hole (including the first hole 205, the second small hole 206, and the like) are all coaxial.

The array magnetic connector 2 is provided with multiple rows and columns of holes. Therefore, one array magnetic connector 2 can connect many optical fibers at the same time, realizing the connection of multiple pairs of optical fibers.

In this embodiment, due to the structure of the hole and the magnetic property provided in the hole, the optical fiber pin only needs to insert slightly into the hole, and then can be automatically attracted by the hole. In addition, due to the slight difference between the slopes and the configuration of the first and second elastic pads, the insertion of the optical fiber pin is not only more stable, but also has a buffering effect, thereby avoiding the damage caused by a large rigid collision of the rapid attraction due to the magnetic force with the hole, or the damage of an head portion of the optical fiber. Moreover, it is also advantageous to protect the optical fiber by providing hole cavity (such as the first and the second hole cavities), and to ensure the effectiveness for pairing the two optical fibers, because if the hole cavities are too large and the optical fibers are too thin, there will be an error in the pairing of the fibers on both sides, resulting in poor pairing effect and low light transmission efficiency. Therefore, the hole cavities can ensure the pairing effect and light transmission efficiency of the two fibers to some extent. In addition, if the optical fiber extents out the fiber pin slightly longer or the fiber protection nozzle is slightly longer, the two optical fibers will have a strong rigid collision in the cavity, causing damage of the optical fiber. And, when the two optical fibers are paired with each other after the collision, the optical fibers may be not stable, thereby affecting the effective pairing of the two optical fibers. The arrangement including the first elastic pad and the second elastic pad avoids the above disadvantages. The second elastic pad can always be in contact with the end surface of the optical fiber pin, and the through hole in the center of the second elastic pad is always wrapped in the optical fiber or the optical fiber protecting nozzle, which increases the stability of the optical fiber and the pin, avoids any sloshing or instability, and achieves a good overall effect.

If this embodiment is based on embodiment 2, through the magnetic properties between the hole and the optical fiber pin and that between the cover plate and the annular ring, the magnetic force can better controlled, thereby achieving a better controlling for the pairing of optical fibers.

Embodiment 4

A method for using array magnetic optical fiber connector is provided. The method includes the following operations.

Step 1: optical fibers are prepared, and a main body 107 and optical fiber pins 101 are sleeved on an end of the optical fibers to be paired. Preferably, the main body and the optical fiber pins 101 are fixedly connected, such as a soldered or detachable connection (e.g., screw connection). Then, an annular ring 102 is sleeved on an end of the main body near the optical fiber pins 101 and abuts a rear end of a protruding portion 104. An annular ring holder 103 is sleeved on the main body by a means of thread connection and tightly presses the annular ring 102 against the rear end of the protruding portion 104, so that the annular ring cannot be moved backward.

Step 2: the optical fiber pin 101 wrapped with the optical fibers of Step 1 is inserted into a hole of the array magnetic connector 2 from one side of the hole, so that the optical fiber magnetic joint 1 and the array magnetic connector 2 are magnetically connected. Then another optical fiber pin wrapped with the optical fiber is inserted into the hole from other side of the hole, and thus the optical fiber pins on both sides of the hole are close to or in contact with each other at a center of the hole, so that ends of the two optical fibers wrapped in two optical fiber pins are close to or in contact with each other, achieving a light transmission.

Step 3: after use, it is just required to apply a force greater than the magnetic force to pull out the optical fiber from the array magnetic connector 2. After use, the optical fiber magnetic joint 1 can also be removed from the optical fiber at the same time. Of course, the optical fiber magnetic joint 1 may be not removed, as long as it does not affect the normal use or storage of the optical fiber.

For the magnetic connection of the above step 2, it may be achieved by the magnetic connection between the annular ring 102 and the cover palate in example 2, or the magnetic connection between the optical fiber pin and the hole in embodiment 3 (when the embodiment 3 is based on embodiment 1), or the magnetic connection between the annular ring 102 and the magnetic cover palate and the magnetic connection between the optical fiber pin and the hole in embodiment 3 (when the example 3 is based on embodiment 2).

The magnetic attraction is such that any one of the magnetic components (such as annular ring, cover plate, etc.) includes an N pole and an S pole, and the N pole of one magnetic component can attract with the S pole of the other magnetic component, which belong to prior art and can be seen in the prior art.

Embodiment 5

Referring to FIG. 5, the optical fiber pin shown is a cylinder made of stainless steel, has a length of 9.8 mm, a diameter of 3.172 mm, and has a through-round hole having a diameter of 0.4 mm at the center for embedding an optical fiber with a 0.4 mm diameter. The cylindrical body of the optical fiber pin has a diameter of 4 mm and has a threaded structure. The annular ring is a ring-shaped neodymium iron boron permanent magnet, has a center hole with diameter of 4 mm (i.e., the inner diameter of the annular ring), and can pass through the main body of the optical fiber pin. The annular ring holder 103 can be a metal ring with an inner thread and can be secured to the optical fiber holder by matching with the threads of the main body. Of course, the annular ring may be fixed by other means such as bonding, welding, and the like. A protecting polymer jacket is provided behind the annular ring holder 103 for protecting the optical fiber.

The array magnetic connector 2 may be composed of two magnetic cover plates and a main body portion 201. The magnetic cover plates are made of neodymium iron boron permanent magnet and have a hole-type array in which the hole has a diameter of 3.172 mm, allowing the optical fiber pins to pass. The hole-type array is formed by a 3×3 square matrix with a pitch of 8 mm. The hole-type array may be formed by a hexagonal matrix, or a plurality of concentric circular arrangements or in other arrangements. The magnetic cover plate is 2 mm may have a thickness of 2 mm and the main body portion may have a thickness of 17.6 mm After two optical fiber magnetic fiber joints are inserted, the end surfaces of two optical fiber pins are just tightly fitted.

In order to protect end surfaces of the optical fiber pins and end surfaces of the optical fibers, the thickness of the main body can be increased by about 0.1 mm through a precision machining, so that after two optical fiber magnetic fiber joints are inserted, they are separated by a distance of 0.1 mm without contacting with each other. This distance may also be between 0.01 mm and 0.5 mm.

In order to adjust the tightness of the connection between the optical fiber magnetic joint 1 and the array magnetic connector 2, it is possible to adjust the diameter of the annular ring of the optical fiber magnetic joint 1 within a range of 5 mm to 20 mm. The larger the diameter is, the larger the magnetic force is. The tightness can also be controlled by adjusting the pitch between the optical fiber magnetic joint 1 and the magnetic cover plate within a range of 0 mm-1 mm. The larger the pitch is, the lower the connection strength is.

Embodiment 6

An optical fiber guidewire is provided. The optical fiber includes an optical fiber and an array magnetic optical fiber connector detachably connected to the optical fiber. The array magnetic optical fiber connector includes an optical fiber magnetic joint and an array magnetic connector in any one of embodiments 1-5. Therefore, the optical fiber magnetic joint and the array magnetic connector can be seen from the above embodiments, and will not be described again.

The optical fiber described in this embodiment includes a core fiber for transmitting light and a tubular main body wrapped around the core fiber. The optical fiber may be any optical fiber that needs to be paired or have any length.

Of course, the optical fiber may be any optical fiber mentioned in the applications previously filed (such as 201611234625.X, 201621456029.1, 201720282846.8, 201710173677.9) by the applicant. The optical fiber generally has a length of 1-2 m, a diameter of 90-2000 μm, and can pass through long blood vessels to reach the affected part of human body. For example, starting from the thigh femoral artery, the optical fiber reaches a liver tumor site by passing through about 1-1.6 m blood vessels, and provides laser for the liver tumor site. A photosensitizer drug is used to treat the tumor when a specific wavelength of laser is irradiated to the photosensitizer drug given on the tumor site.

In the disclosure, materials used for the magnetic components are Fe, Co, Ni or alloys thereof, or a rare earth element and alloys thereof, or a Mn-containing compound. It may be specifically mentioned to an aluminum nickel cobalt permanent magnet alloy, iron chromium cobalt permanent magnet alloy, rare earth cobalt permanent magnet material, neodymium iron boron permanent magnet or other composite materials. A material of the optical fiber pin of the optical fiber magnetic joint 1 may be ceramic, stainless steel or other metals and alloys.

The above description are only preferred embodiments of the present disclosure. It should be appreciated that various modifications and changes can be made to the present disclosure. Any modifications, equivalents, improvements, etc. made within the spirit and scope of the disclosure are intended to be included within the scope of the disclosure.

The invention claimed is:

1. An optical fiber guidewire, comprising:
optical fibers and
an array magnetic optical fiber connector detachably connected to the optical fibers, comprising optical fiber magnetic joints disposed on the optical fibers,
wherein the optical fiber guidewire further comprises array magnetic connectors mated with the optical fiber magnetic joints;
the array magnetic connectors are provided with a plurality of holes;
the optical fiber magnetic joint comprises optical fiber pins capable of being sleeved around a periphery of the optical fibers, the optical fiber magnetic joint further comprises an annular ring and an annular ring holder for holding the annular ring both, the annular ring is disposed at a rear end of the optical fiber pin, the annular ring holder is disposed at a rear end of the annular ring and fixes the annular ring on the optical fiber, and the optical fiber pins protrude into the holes to pair the optical fiber wrapped in the optical fiber pins with the optical fiber that protrudes from the other side of the hole;
when the optical fiber pins are inserted into the holes, the optical fiber pins on both sides of the holes are paired to connect two optical fibers wrapped in the optical fiber pins, so as to realize a light transmission;
the optical fiber magnetic joint is connected with the array magnetic connector through a magnetic attraction between each other;
wherein the optical fiber magnetic joint further comprises a tubular main body capable of exactly sleeving over the optical fibers, wherein a front end of the tubular main body is connected to the optical fiber pin;
the annular ring and the annular ring holder are both disposed outside the tubular main body;
wherein a protruding portion having a diameter larger than a diameter of the tubular main body is disposed on a position of the tubular main body near the optical fiber pin; the annular ring abuts against the protruding portion; and
an inner diameter of the hole is not larger than an outer diameter of the protruding portion, so that the protruding portion and a rear portion of the protruding portion is unable to insert into the hole.

2. The optical fiber guidewire according to claim 1, wherein a tail protecting jacket capable of sleeving over the optical fiber is connected to a rear end of the tubular main body.

3. The optical fiber guidewire according to claim 1, wherein an outer thread is provided on the tubular main body, and an inner thread that matches with the outer thread is provided on an inner wall of the annular ring holder, so as to tightly fix the annular ring holder and the tubular body for realizing the fixation of the annular ring;
the annular ring preferably is a magnetic annular ring, which is capable of connecting with the array magnetic connector by the magnetic attraction.

4. An optical fiber guidewire, comprising:
optical fibers and
an array magnetic optical fiber connector detachably connected to the optical fibers, comprising optical fiber magnetic joints disposed on the optical fibers,
wherein the optical fiber guidewire further comprises array magnetic connectors mated with the optical fiber magnetic joints;
the array magnetic connectors are provided with a plurality of holes;
the optical fiber magnetic joint comprises optical fiber pins capable of being sleeved around a periphery of the optical fibers;
when the optical fiber pins are inserted into the holes, the optical fiber pins on both sides of the holes are paired to connect two optical fibers wrapped in the optical fiber pins, so as to realize a light transmission;
the optical fiber magnetic joint is connected with the array magnetic connector through a magnetic attraction between each other;
wherein the array magnetic connector comprises a main body portion and cover plates disposed on two opposite sides of the main body portion;
the holes penetrate through the main body portion and the two cover plates.

5. The optical fiber guidewire according to claim 4, wherein the cover plates are magnetic cover plates, and when the optical fiber magnetic joint is inserted into the hole, the two cover plates are respectively magnetically attracted to two magnetic annular rings on both sides.

* * * * *